US012706977B2

(12) United States Patent
Ulrich et al.

(10) Patent No.: US 12,706,977 B2
(45) **Date of Patent: *Aug. 11, 2026**

(54) SYSTEM AND METHOD FOR IMPROVED OPT-OUT RECOGNITION FOR A MOBILE DEVICE

(71) Applicant: ACK Ventures Holdings, LLC, Boca Raton, FL (US)

(72) Inventors: David Ulrich, New York, NY (US); Harry Kargman, New York, NY (US); Steve Anson, Stamford, CT (US); Jeremy Sadwith, Brooklyn, NY (US); Bernhard Valenti, New York, NY (US); Ryan McConville, Brooklyn, NY (US)

(73) Assignee: ACK Ventures Holdings, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/750,635

(22) Filed: Jun. 21, 2024

(65) Prior Publication Data

US 2025/0097307 A1 Mar. 20, 2025

Related U.S. Application Data

(63) Continuation of application No. 18/134,660, filed on Apr. 14, 2023, now Pat. No. 12,021,936, which is a continuation of application No. 17/240,481, filed on Apr. 26, 2021, now Pat. No. 11,632,433, which is a continuation of application No. 16/534,350, filed on Aug. 7, 2019, now Pat. No. 10,992,771, which is a continuation of application No. 15/247,679, filed on Aug. 25, 2016, now abandoned.

(60) Provisional application No. 62/274,627, filed on Jan. 4, 2016, provisional application No. 62/209,499, filed on Aug. 25, 2015.

(51) Int. Cl.

*G06F 15/16* (2006.01)
*H04L 67/303* (2022.01)
*H04W 88/02* (2009.01)

(52) U.S. Cl.

CPC .......... *H04L 67/303* (2013.01); *H04W 88/02* (2013.01)

(58) Field of Classification Search

None

See application file for complete search history.

(56) References Cited

U.S. PATENT DOCUMENTS

| | | | |
|---|---|---|---|
| 9,913,141 | B2 | 3/2018 | Ulrich et al. |
| 10,257,703 | B2 | 4/2019 | Ulrich et al. |

(Continued)

OTHER PUBLICATIONS

Wikipedia, HTTP ETag. Retrieved online at: http://en.wikipedia.org/wiki/HTTP_ETag. 3 pages. Jan. 31, 2017.

*Primary Examiner* — Umar Cheema
*Assistant Examiner* — Andrew Woo
(74) *Attorney, Agent, or Firm* — McCarter & English, LLP

(57) ABSTRACT

A technique for identifying an opt-out status for a user's mobile or other computing device without relying exclusively on client-side storage or primarily on the use of non-determinative mechanisms is discussed. Embodiments provide server-based or otherwise hosted techniques of accurately identifying devices of users that wish to opt-out of having their device activity tracked. These techniques enable accurate identification of a device's opt-out status even in the absence of a client-side opt-out indicator.

14 Claims, 10 Drawing Sheets

(56) References Cited

U.S. PATENT DOCUMENTS

| | | | | |
|---|---|---|---|---|
| 10,299,125 | B2 | 5/2019 | Ulrich et al. | |
| 10,779,164 | B2 | 9/2020 | Ulrich et al. | |
| 10,992,771 | B2 | 4/2021 | Ulrich et al. | |
| 11,411,928 | B2 | 8/2022 | Ulrich et al. | |
| 11,632,433 | B2 | 4/2023 | Ulrich et al. | |
| 12,015,595 | B2 | 6/2024 | Ulrich et al. | |
| 12,021,936 | B2 | 6/2024 | Ulrich et al. | |
| 2006/0036611 | A1 | 2/2006 | Rothschild | |
| 2007/0003046 | A1 * | 1/2007 | Batni ................ | H04M 3/42017 379/215.01 |
| 2007/0180031 | A1 | 8/2007 | Stern et al. | |
| 2010/0094704 | A1 | 4/2010 | Subramanian et al. | |
| 2013/0104238 | A1 | 4/2013 | Balsan et al. | |
| 2014/0090041 | A1 | 3/2014 | Kim et al. | |
| 2016/0267523 | A1 | 9/2016 | Biswas et al. | |
| 2017/0064032 | A1 | 3/2017 | Ulrich et al. | |

* cited by examiner

Figure 3C

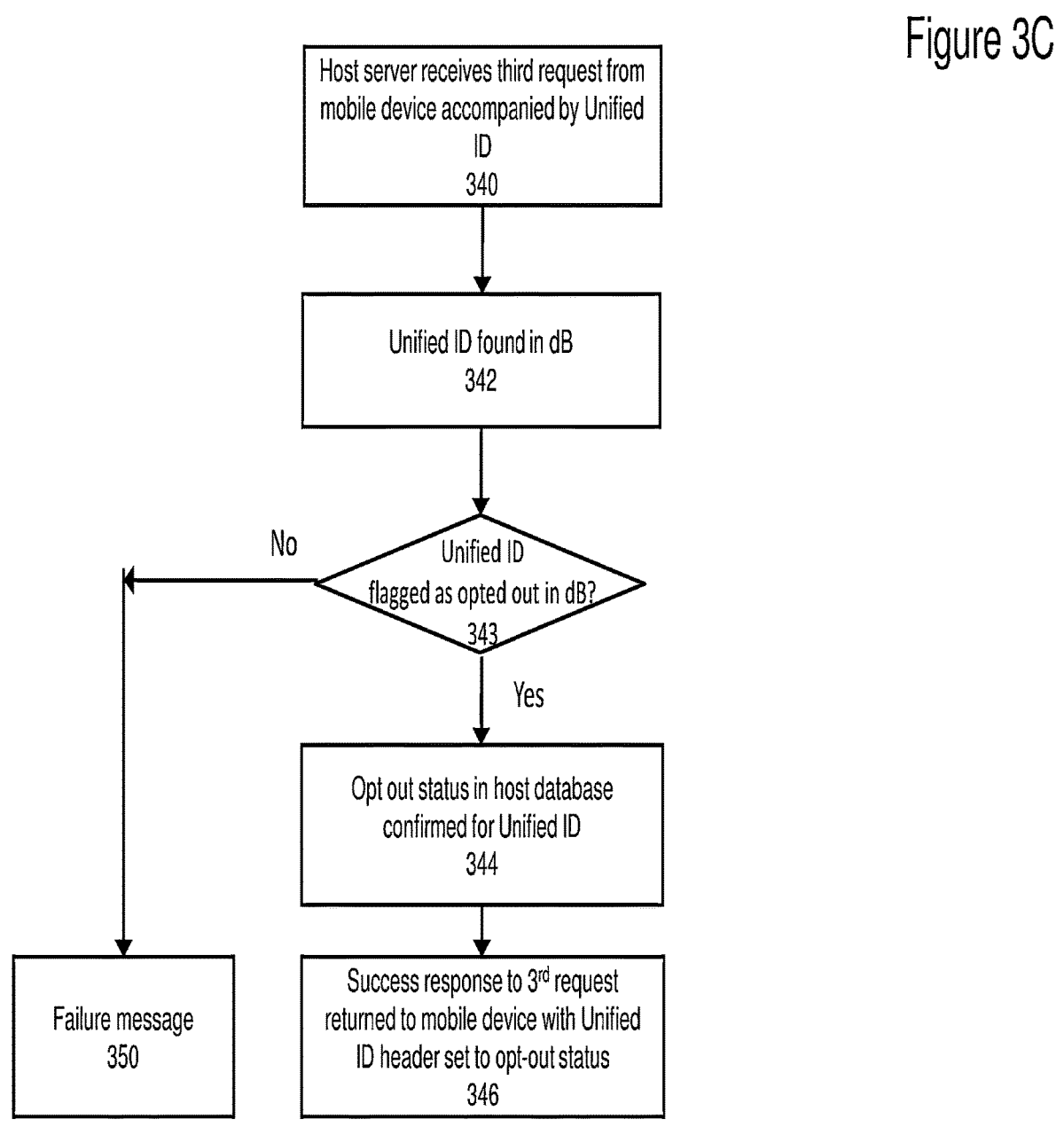

Host server receives third request from mobile device accompanied by Unified ID
340

Unified ID found in dB
342

Unified ID flagged as opted out in dB?
343

No

Yes

Opt out status in host database confirmed for Unified ID
344

Success response to 3rd request returned to mobile device with Unified ID header set to opt-out status
346

Failure message
350

3d Party Website 630
Web page 632
Opt-out code snippet 634
Network 600

Mobile Device 610
Web page 632
Opt-out code snippet 634
Host Server 620

SYSTEM AND METHOD FOR IMPROVED OPT-OUT RECOGNITION FOR A MOBILE DEVICE

RELATED APPLICATIONS

This application is a continuation application of U.S. application Ser. No. 18/134,660, filed Apr. 14, 2023, which is a continuation application of U.S. application Ser. No. 17/240,481, filed Apr. 26, 2021, which is a continuation application of U.S. application Ser. No. 16/534,350, filed Aug. 7, 2019, which was a continuation of U.S. application Ser. No. 15/247,679, filed Aug. 25, 2016, which claimed the benefit of, and priority to, U.S. Provisional Patent Application No. 62/209,499, entitled "Cookie-Less Opt-out for A Mobile Device", filed Aug. 25, 2015, and U.S. Provisional Patent Application No. 62/274,627 entitled "Cookie-Less Opt-out for A Mobile Device", filed Jan. 4, 2016, the contents of all of the above applications being incorporated herein by reference in their entirety. This application is also related to U.S. application Ser. No. 15/236,626, entitled "System and Method for Improved Identification of a Mobile Device", now U.S. Pat. No. 9,913,141, filed Aug. 15, 2016.

BACKGROUND

Web sites frequently wish to track visits by mobile and other computing devices for advertising and other reasons. Web sites can track users by gathering personally identifiable information (PII) or non-PII information based on a user's mobile (or other) device's activities. PII is information that can be used on its own or be combined with other information to identify a specific individual and its use as an identifier raises privacy concerns. Non-PII information may be associated with a user (or more particularly to a user's mobile device) that leaves the device and its user identifiable without revealing their actual identity. However, for privacy reasons, many users do not wish to have their activities tracked in either fashion. Conventional methods to opt-out of the monitoring and tracking of a user's mobile device activity rely on the use of client-based storage, such as cookies or a web browser cache, to hold an indicator of the device's opted-out status (cookies are small text files stored in the web browser of the user's mobile device). This opt-out identifier is provided in requests from the mobile device to web sites when retrieving data. Upon detecting the opted out status, the web sites may provide the requested resource but do not accumulate data related to that device's activities.

BRIEF SUMMARY

Embodiments of the present invention provide a technique for improved recognition of an opt-out status for a user's mobile or other computing device without relying exclusively on client-side storage of an opt-out indicator or primarily relying on the use of non-determinative mechanisms. Embodiments provide server-based or otherwise hosted techniques of accurately identifying devices of users that wish to opt-out of having their device activity tracked. A unified identifier with improved persistence that bridges mobile app to mobile web and to other web browser-compatible mediums is utilized to identify an individual device. Using a unique verification identifier, such as, but not limited to, a carrier ID, Wi-Fi identifier or other device identifier, the unified identifier is consistently verified, revived and distributed across application and browser mediums including browsers that exist inside downloadable applications. An opt-out status is associated with the stored unified identifier and requests from devices associated with the unified identifier are handled based on the stored opt-out status. As described herein, these techniques enable accurate identification of a device's opt-out status even in the absence of a client-side opt-out indicator.

In one embodiment a method for associating opt-out status to a unified identifier ("Unified ID") for a mobile device includes receiving at a host server a request for a Unified ID from a mobile device, the Unified ID being an identifier uniquely identifying the mobile device. The method also includes identifying a unique verification identifier for the mobile device and creating the Unified ID for the mobile device at the host server in response to the request. Additionally, the method includes storing, via the host server, the Unified ID and the verification identifier in a storage location, the stored Unified ID associated with the stored verification identifier in the storage location. The method also includes transmitting the Unified ID to the mobile device for storage on the mobile device and receiving a request at the host server from the mobile device for an opt-out status. Further, the method includes verifying the Unified ID with the verification identifier and assigning, via the host server, the opt-out status for the mobile device to the Unified ID, the opt-out status stored in the storage location and associated with the Unified ID.

In another embodiment a computing device configured for associating opt-out status to a unified identifier ("Unified ID") for a mobile device includes a communication interface and a processor. The communication interface is configured to receive over a network requests originating from a mobile device. The processor is configured to execute instruction that when executed cause the computing device to receive a request for a Unified ID from a mobile device, the Unified ID being an identifier uniquely identifying the mobile device. The instructions further cause the computing device to identify a unique verification identifier for the mobile device, create the Unified ID for the mobile device in response to the request and store the Unified ID and the verification identifier in a storage location. The stored Unified ID is associated with the stored verification identifier in the storage location. The instructions when executed further cause the computing device to transmit the Unified ID to the mobile device for storage on the mobile device and receive a request from the mobile device for an opt-out status. Additionally, the instructions when executed further cause the computing device to verify the Unified ID with the verification identifier and assign the opt-out status for the mobile device to the Unified ID. The opt-out status is stored in the storage location and associated with the Unified ID.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 3C depicts an exemplary sequence of steps performed by a host server to confirm an opt-out status for a Unified ID and return an indication of the opt-out status to the mobile device;

DETAILED DESCRIPTION

Figure 1:
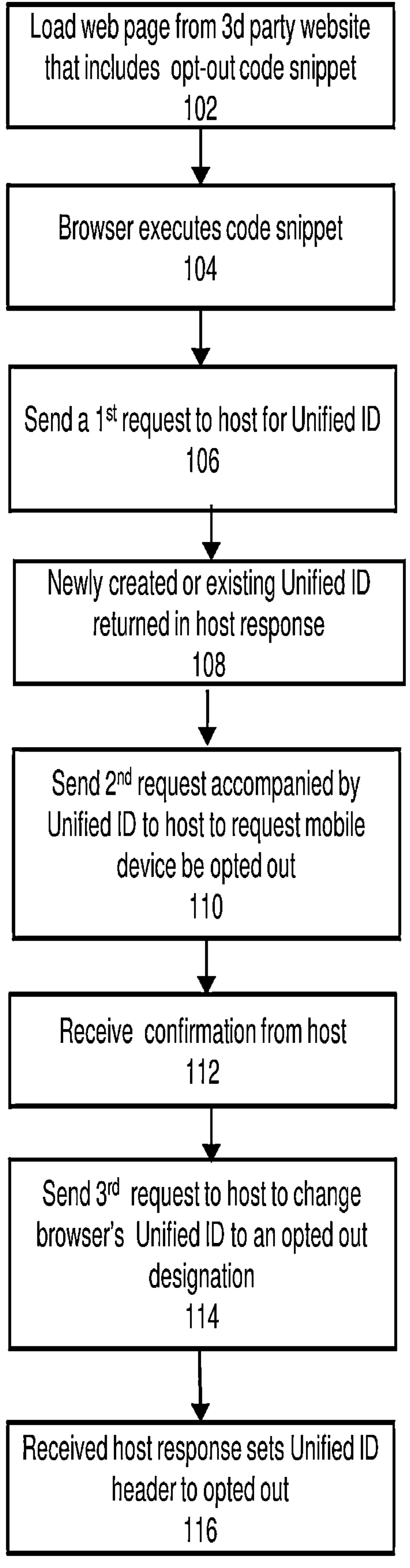
FIG. 1 depicts an exemplary sequence of steps performed by a mobile device to request an opt-out status in an embodiment of the present invention.

Embodiments of the present invention use a persistent alias ID for a requesting mobile device, together with a separate verification ID, to provide a mechanism for ensuring that the device's "opt-out" status that prevents its activities from being monitored is recognized. This technique increases privacy for the user of the mobile or other computing device and allows it, and by extension the associated user, to be more reliably removed from having activities tracked. The alias ID utilized by embodiments of the present invention is assigned by a host server and is referred to herein as a "Unified ID". The mobile device's opt-out status is recorded against the Unified ID by the host server and may be detected even in the event a client-side reference to the Unified ID or its opt-out status is intentionally or inadvertently removed.

Conventionally, while cookies can be used to identify a user's mobile device without relying on personally identifiable information, some browsers are configured not to accept 3$^{rd}$ party cookies or to delete them at the end of a user's web browsing session. For example, Safari®, which is a web browser installed on Apple® mobile devices which currently constitute a large portion of the mobile device market, does not accept 3$^{rd}$ party cookies by default. Additionally, cookies may be manually deleted and a user's browser cache may be flushed upon a specific request or as part of routine programmatic maintenance process. As a result, relying on client-side storage to hold opt-out indicators can lead to erroneous results when determining opt-out status. Further, without the ability to definitively rely on client-side storage to identify the device, many conventional mobile device monitoring techniques are forced to rely on probabilistic methods of determining device identity. For example, device identity may be guessed based on the number of requests originating from a particular Internet Protocol (IP) address and particular networks. These probabilistic methods of identifying a user's device by their very nature produce results containing a degree of uncertainty that are not suitable for determining opt-out status.

Embodiments of the present invention use one or more unique verification identifiers, such as, but not limited to, a carrier ID or device ID, together with an alias ID that acts as a unified identifier with improved persistence that is applicable across various applications and is utilized to identify a user's mobile or other device. As a non-limiting example, the verification identifier may be a device ID, or may be a carrier ID retrieved directly by the host server from an HTTP header in a request received by the host server or identified indirectly by the server using a 3$^{rd}$ party API to furnish the HTTP header. Verification identifiers are discussed further below.

In an embodiment, the Unified ID, as well as any associated opt-out status, is stored by a host server in a storage location such as, but not limited to, a database table, as well as being available on a user's device. For example the Unified ID may be stored in a web browser cache on the user's device in the form of an Entity Tag (ETag). It should be appreciated that the term "web browser" as used herein may refer to a stand-alone web browser such as Apple's Safari® web browser, may refer to a browser that exists inside a downloadable application ("in-app browser"), or may refer to another type of software process offering browser-like functionality. ETags are discussed further below. In some embodiments, a verification identifier may be identified through an external source that includes an external authentication mechanism or through publicly available Hyper-Text Transfer Protocol (HTTP) response headers. Embodiments may provide two levels of authentication: a synchronization of the host and client Unified ID and the acquisition of the verification identifier.

FIG. 1 depicts an exemplary sequence of steps performed in an embodiment by a mobile device to request an opt-out status in which its activities are not tracked. For example, the opt-out status may signal to a website that the user of the mobile device is not interested in participating in Interest-Based Advertising. The sequence begins when a web browser on the user's mobile device loads a web page from a 3$^{rd}$ party website that includes an opt-out code snippet (step 102). In one embodiment, the code snippet is a JavaScript code snippet executable by a web browser. The user of the mobile device may be directed to the web page by a hyperlink referencing the web page. For example, the hyperlink may be contained in another web page outlining a site's privacy rules and offering the user the opportunity to not have his/her activities tracked or used for advertising purposes. The browser executes the code snippet (step 104). The code snippet's execution triggers a series of client and server side actions designed to request and record an opt-out status for the mobile device. The code execution directs the browser to request a Unified ID for the mobile device from a host server (step 106). This triggers a series of functions, both client-side and by the requested host, which attempt to match both a Unified ID and a verification identifier. In one embodiment, the request for the Unified ID is an AJAX request. In another embodiment the request is a JavaScript Object Notation (JSON) request. The host server handles the request in the manner discussed below with respect to FIG. 3 and returns a Unified ID in the response to the request (step 108). For example, the Unified ID may be returned in the form of an ETag in the response to the request. The ETag is an HTTP response header used as a method of storing the Unified ID that remains persistent, until cleared, in the mobile device's web browser cache. In one embodiment, the Unified ID may be formed from a hash of a random number assigned by the host server. In another embodiment, the Unified ID may be some other number assigned by the host server. The Unified ID being returned may be newly created in response to the request for a Unified ID or may be a pre-existing Unified ID previously associated with the mobile device that is retrieved by the host server. The returned Unified ID may be stored in the browser cache and provides an identifier with improved persistence for the mobile device. As noted above, a copy of the Unified ID is stored by the host server as well as being stored on the mobile device. Future requests from the mobile device to the host server may contain a copy of the Unified ID. It should be appreciated that although some of the discussion herein focuses on the use of an ETag being returned in the request to the response, other forms of storing persistent identifiers could be used instead of an ETag without departing from the scope of the present invention and that references to the use of ETags herein should be considered to also illustrate the use of other persistent identifiers.

Following the receipt by the mobile device of the Unified ID, the code snippet execution causes the browser to make a second request to the host server for opt-out status for the mobile device. This $2^{nd}$ request is accompanied by the received Unified ID (step 110). The host server returns a confirmation that is received by the mobile device (step 112). In one embodiment, the code snippet execution causes a $3^{rd}$ request to be sent by the mobile device browser to the host server requesting that the device's browser's cached Unified ID be changed to an opted out designation (e.g.: that the ETag be changed to an opted out designation) (step 114). The host server handles the request and returns a response that sets the Unified ID header to an opt-out status (e.g.: sets the ETag header to an opt-out status) (step 116). In an embodiment, the code snippet execution causes a 4th request (not depicted in FIG. 1) to be sent by the mobile device browser to the host server following the receipt of the response to the third request that attempts to confirm that the client browser's cached Unified ID, such as an ETag, is now recognized as opted out. The host server handles the request and the mobile device receives either a confirmation that the Unified ID is recognized as opted-out and any database records referencing the corresponding Unified ID have been flagged accordingly or else receives a failure response.

Figure 2:
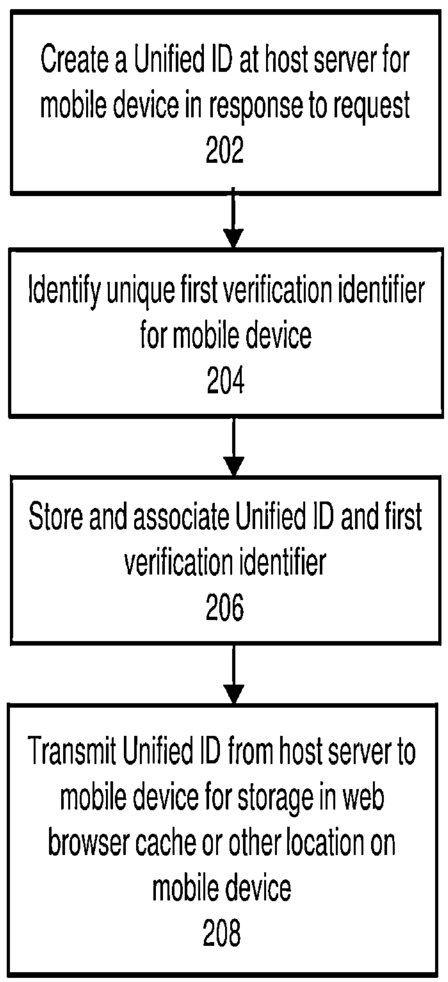
FIG. 2 depicts an exemplary sequence of steps performed by a host server to create a Unified ID for a mobile device in an embodiment of the present invention

An exemplary sequence of steps performed by a host server to create a Unified ID for a mobile device in an embodiment of the present invention is depicted in FIG. 2. The sequence begins with the host server creating a Unified ID for a requesting mobile device in response to a request received from a mobile device (step 202). As discussed above, this request may be automatically triggered by a client browser executing code in a web page. A verification module on the host server attempts to identify a unique first verification identifier for the mobile device (step 204). This first verification identifier may be contained in the HTTP header of the request or may be otherwise obtained by the verification module. Additional types of verification identifiers are discussed further below. The verification module stores the created Unified ID and the first verification identifier, if one was identified at the time of the creation of the Unified ID, in a database or other storage location accessible to the host server. An association between the Unified ID and the unique first verification identifier of the mobile device is also stored in the database (step 206). If the first verification identifier is not initially identified, it may be identified later during a subsequent communication with the host server and associated with the Unified ID in the database or other location at that time. As explained further below, additional unique verification identifiers for the mobile device may also be associated with the Unified ID in storage, either at the same time or subsequently if identified later. The created Unified ID is then forwarded to the mobile device from the host server in the form of an ETag or other form for storage in the web browser cache or other location on the mobile device (step 208).

In one embodiment, the handling of the received request for a Unified ID by the host server varies depending on whether or not the requesting mobile device has already been assigned a Unified ID. To assist a verification module in making the determination, the request for a Unified ID may use an "if-none-match" HTTP header in the request which may or may not include a Unified ID as part of the request header. There may be a number of reasons why a Unified ID is not included in the header of the request. For instance, the request may be the first from the mobile device to the host server so that the mobile device has not yet been assigned a Unified ID. The mobile device may also have flushed its browser cache so that the local copy of the Unified ID is not available. If the host server receives a request without a Unified ID, the verification module may seek to determine whether the Unified ID is missing or has not yet been assigned to the mobile device. A verification identifier for the requesting mobile device is identified and used in processing the request for the Unified ID. As noted above, in one example, the verification identifier may be a carrier ID and may be retrieved directly by the host server from an HTTP header in a request received by the host server (if the mobile device is communicating via a cellular network). The carrier ID may also come in the form of a normalized identifier from a third party aggregator. For example, in one embodiment, the third party aggregator may take separate carrier IDs (such as those provided by T-Mobile™, Sprint™, Verizon™ and AT&T™) and provide an alpha-numeric representation of the identifier. Alternatively, the verification identifier may be retrieved indirectly by the server by making an additional request to a Mobile Network Operator (MNO) via a $3^{rd}$ party API to provide a carrier ID. In the case of an MNO, rather than the carrier furnishing the traffic between the mobile device and the host server, a request may be made to a third party to host the verification process and act as an intermediary. The third party verifier intercepts the traffic from the mobile device to the host server, appends the carrier ID, then forwards the original traffic (containing the Unified ID if available) to the server. It should be noted that this attempt to retrieve a verification identifier from the MNO will only be successful if the user's phone is communicating over a cellular network and not communicating via Wi-Fi.

If a verification identifier for the requesting device cannot be retrieved, the verification module uses a current or newly created Unified ID which can be stored. Once the verification identifier for the mobile device has been identified, the host server checks a database or other storage location to which it has access to see if that verification identifier is stored and associated with a Unified ID for the requesting mobile device. If the verification identifier has not been previously saved, the verification module determines that the requesting device has not previously been assigned a Unified ID. In such a case, a Unified ID is created for the mobile device and transmitted to the mobile device in the form of an ETag or other persistent device identifier. A copy of the created Unified ID is saved by the host server and linked with the verification identifier which is also saved. Alternatively, if the check of the database finds the verification identifier and an associated Unified ID, the Unified ID may be retrieved from storage and returned to the mobile device in the form of an ETag or other persistent device identifier to be stored in the mobile device's browser cache or other location on the mobile device. As a third possibility, the original "if-none-match" request to the host server may include a Unified ID provided by the mobile device. In such a case, the legitimacy of the Unified ID accompanying the request is verified using the verification identifier to retrieve the Unified ID linked to the verification identifier by the host server which is then compared to the retrieved Unified ID that accompanied the request. It should be appreciated, that alternate request mechanisms, not relying specifically on "if-none-match" requests, are also within the scope of the present invention.

Figure 3A:
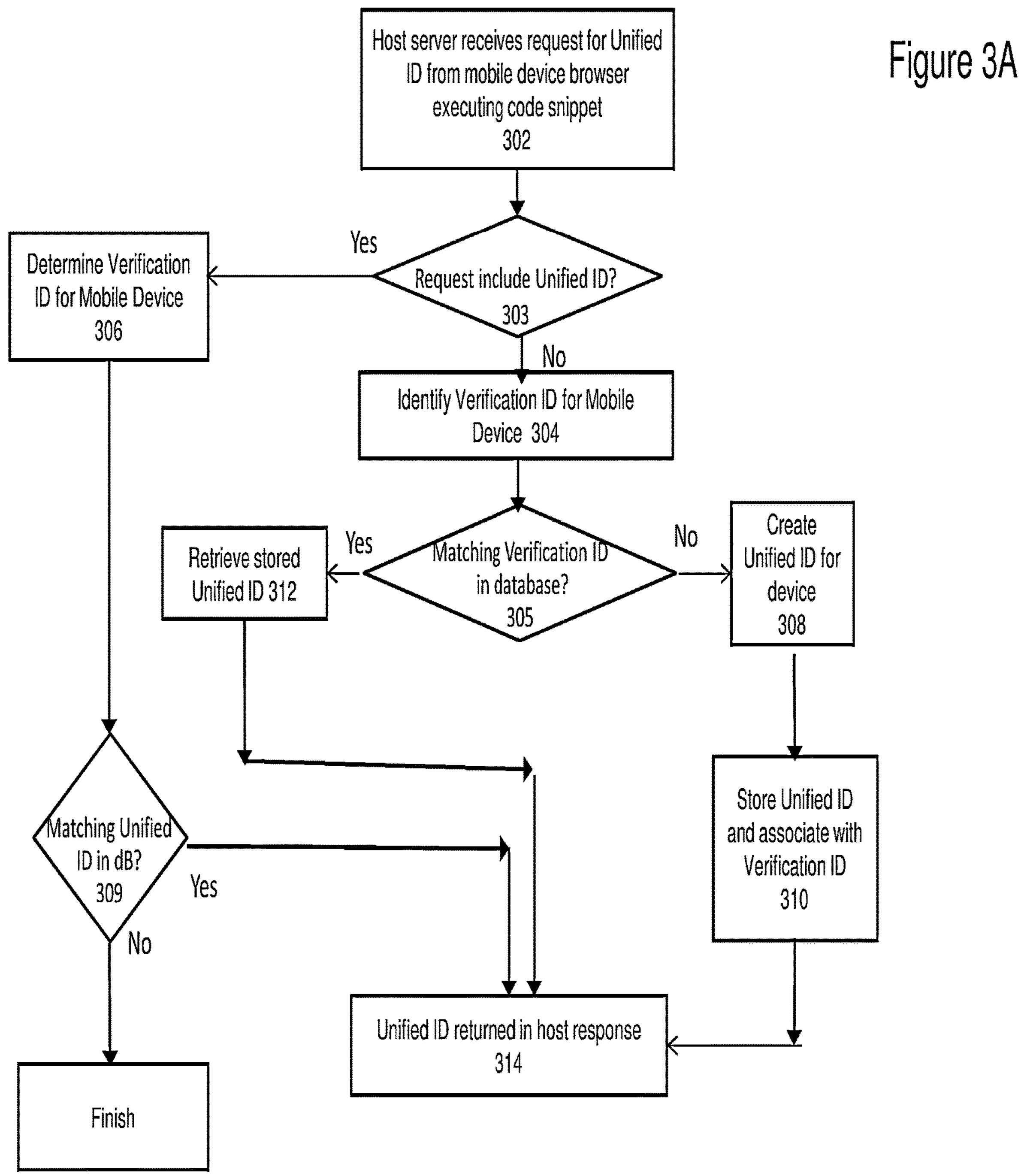
FIG. 3A depicts an exemplary sequence of steps performed by a host server to handle a request for, and verify, a Unified ID for a user's mobile device in an embodiment of the present invention.

In order for an opt-out request from a mobile or other device to be properly processed in an embodiment of the present invention, a Unified ID must first be created or identified and returned to the requesting device. An exemplary processing sequence performed by the host server in response to the receipt of a request for a Unified ID in an embodiment is depicted in FIG. 3A. The sequence begins with the host server receiving a request for a Unified ID from the mobile device browser executing the code snippet embedded in the loaded 3rd party web page as discussed above (step 302). As also discussed above, the request may be in the form of an HTTP request including an "if-none-match" header. A verification module executing on the host server processes the request and first seeks to determine whether there is a Unified ID already assigned to the requesting mobile device. To make this determination, the request is examined to determine whether it contains a Unified ID (step 303). If the request does not contain a Unified ID, a verification identifier, such as a carrier ID or device ID, is determined for the requesting device as described above (step 304). Once the verification identifier for the requesting device is determined, the verification module checks a database or other storage location for the verification identifier's presence (step 305). If a saved copy of the verification identifier does not exist (step 305), the verification module determines that the requesting mobile device has not previously been assigned a Unified ID and a new Unified ID is created for the requesting device (step 308). For example, a random number for the requesting device may be assigned by the server and the Unified ID may be formed by hashing the random number. The verification identifier and its association to the created Unified ID are stored in the database or other location by the host server (step 310). The created Unified ID in the form of an ETag or other persistent device identifier is then returned to the requesting device (step 314).

If a matching verification identifier for the requesting device is present in the database or other location (step 305), and the request does not include a Unified ID, the previously stored Unified ID associated with the verification identifier for the mobile device is identified and retrieved from storage (step 312). For example, this situation may occur in the event the mobile device manually deletes its Unified ID but then makes a subsequent request to the host server. The carrier ID, device ID or other verification identifier that has been saved and associated with a Unified ID can be used to verify the identity of the requesting mobile device and restore the Unified ID. The Unified ID is returned to the requesting mobile device (step 314).

If the request received by the host server includes a Unified ID in the header or otherwise accompanying the request (step 303), the legitimacy of the Unified ID may be verified to determine whether it is associated with the requesting mobile device (i.e. to make sure the Unified ID has not been fraudulently transferred to a different device). To verify the Unified ID, a verification identifier for the mobile device is determined (step 306) and a database query is executed to see if the stored verification identifier for the requesting device is associated with the same Unified ID (step 309). If the Unified ID is not verified, depending on implementation, the verification module may return the unverified Unified ID to the requesting device (step 314) treat the requesting device as if it had never been assigned a Unified ID and instead create a Unified ID for return to the mobile device (step 308), end by returning an error message, or take some other specified action. If the Unified ID is verified, the Unified ID is returned to the requesting mobile device (step 314). Once returned to the mobile device (step 314) the Unified ID remains persisted in the client's web browser cache (or other storage location on the client) unless cleared. In one embodiment, additional parameters accompanying the Unified ID may also be returned to the requesting device. For instance, a flag indicating that a future verification request should not be made in order to reduce the number of network requests may be returned with the Unified ID.

Figure 3B:
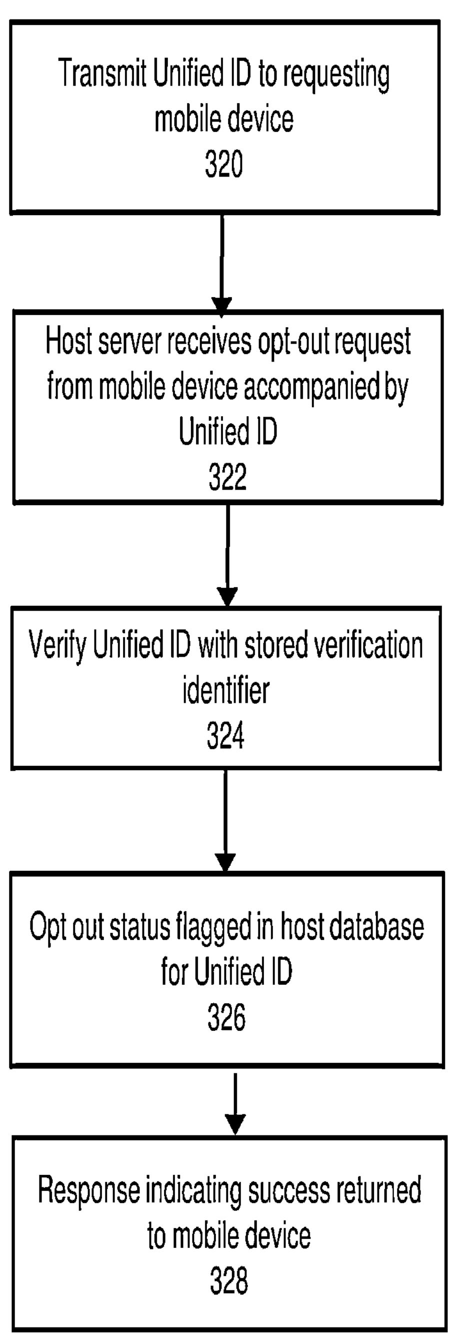
FIG. 3B depicts an exemplary sequence of steps performed by a host server to store an opt-out status for a Unified ID in an embodiment of the present invention.

As noted above, the execution of the opt-out code in the mobile device browser causes the mobile device to send a second request to the host server upon receiving a Unified ID from the host server. This second request is a request that the host server record the mobile device's opt-out status. FIG. 3B depicts an exemplary sequence of steps in an embodiment performed by a host server to handle a request for a mobile device to be opted out of activity tracking and/or Interest-Based Advertising. After returning the Unified ID to the mobile device (step 320), the host server receives a request from the mobile device for opt-out status accompanied by the Unified ID (step 322). For example, the opt-out request contains a parameter indicating that the mobile device is opting out of having its activities tracked. The Unified ID is verified using a verification identifier as described above (step 324) and, when verified, the Unified ID is flagged as opted out in the host server database (step 326) and a response, such as an HTTP/1.1 200 OK response is returned to the mobile device indicating success (step 328).

In one embodiment, following the assigning of the opt-out status to the Unified ID in the database, the host server will arrange to set the Unified ID in the mobile device to an opt-out status. FIG. 3C depicts an exemplary sequence of steps in an embodiment performed by a host server to handle a request to change the client/mobile device's web browser cached Unified ID to "opt-out" or similar anonymous type identifier. The sequence begins with the host server receiving a request from the mobile device for the opt-out change (step 340). For example, this request may be the $3^{rd}$ request triggered by the opt-out code snippet described above. The verification module then identifies the Unified ID included with the request in the database on the host server (step 342) and the opt-out status is determined (step 343). If the Unified ID is flagged as opted out in the database (step 344), a success response is returned to the mobile device with the Unified ID header set to opt-out status (e.g. the ETag header may be set to an opt-out status) (step 346). If it is determined that the Unified ID is not flagged as opted out in the database (step 343) a failure message may be transmitted in a response to the mobile device (step 350).

In one embodiment, an additional request may optionally be made to the host server to confirm that the client browser's cached Unified ID is being recognized as opted out or is similarly designated and that any database records referencing the Unified ID have been flagged accordingly. For example, this may be the $4^{th}$ request triggered by the opt-out code snippet described above and an exemplary sequence of steps performed by a host server to handle a request for confirmation of a mobile device's opted out status may begin with the host server receiving a request for confirmation accompanied by the Unified ID with the opt-out header status. The Unified ID opt-out status is identified in the header by the host server and a success response is returned to the mobile device to confirm the recognition of opt-out status. For example, an HTTP/1.1 200 Ok response may be sent.

In one embodiment, after the Unified ID has been flagged with an opt-out status in the database, the host server may receive a subsequent request for a resource from a mobile or other device accompanied by the Unified ID. The host server may verify the Unified ID by identifying a verification identifier for the requesting device and matching it to a verification identifier stored in the database that is associated with the Unified ID. Following the verifying of the Unified ID, the host server notes the opt-out status for the Unified ID and so processes the request for the resource without storing data in association with the Unified ID.

In another embodiment, after the Unified ID has been flagged with an opt-out status in the database, the host server may receive a subsequent request for a resource from a mobile or other device that is not accompanied by the Unified ID. The host server may identify the Unified ID by identifying a verification identifier for the requesting device and matching it to a verification identifier stored in the database (that is associated with a Unified ID). Following the matching of the verification identifiers and the determination of the associated Unified ID, the host server notes the opt-out status for the Unified ID stored in the database and so processes the request for the resource from the mobile device without storing data in association with the Unified ID.

Figure 4:
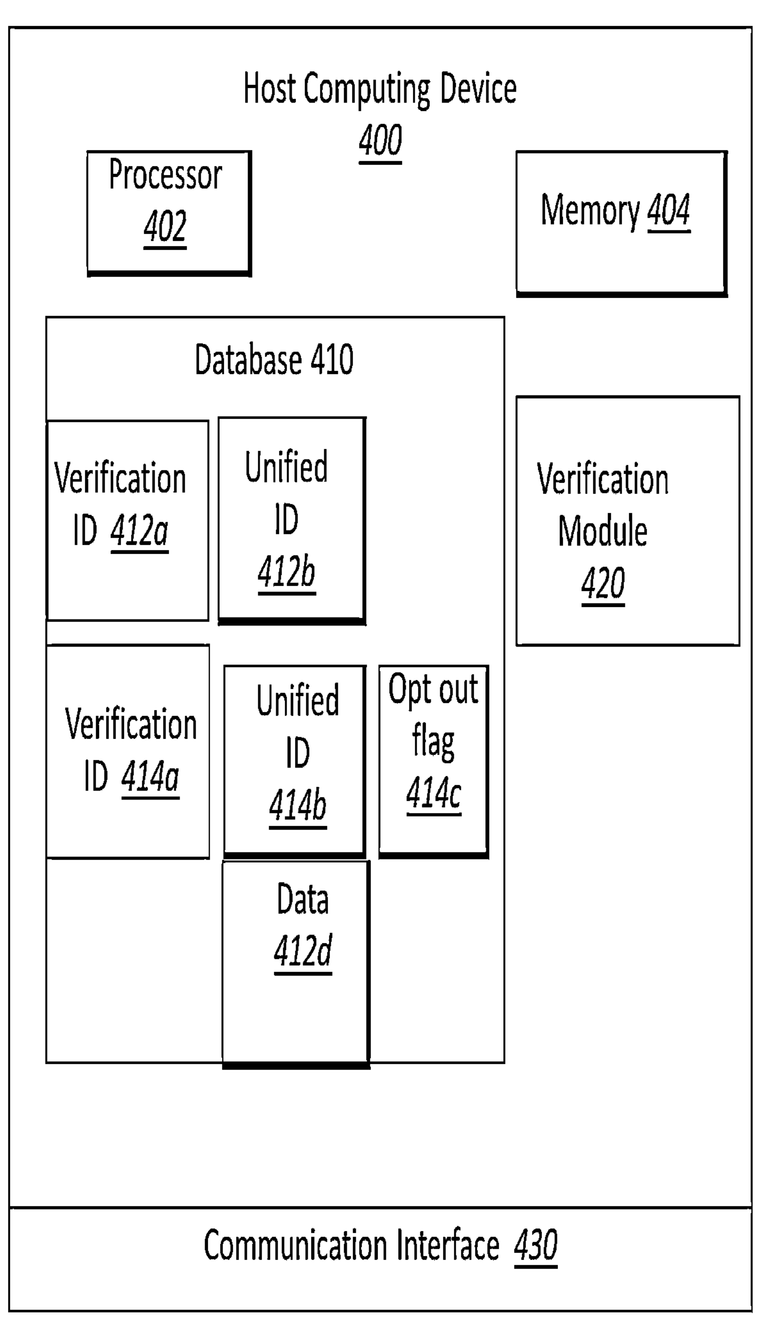
FIG. 4 depicts an exemplary host computing device suitable for use by an embodiment of the present invention.

FIG. 4 depicts an exemplary host computing device suitable for use by an embodiment of the present invention. A host computing device 400, such as a host server, includes one or more processors 402 such as CPUs and memory 404. Memory 404 may include Read Only Memory (ROM) and Random Access Memory (RAM). Host computing device 400 also includes communication interface 430 suitable for communicating over a network with a requesting device. Host computing device 400 may also include, or have access to, database 410. Database 410 holds information related to mobile or other devices. More particularly, database 410 includes verification identifiers 412*a* and 414*a* respectively associated with Unified IDs 412*b* and 414*b*. Database 410 may also include opt-out flag 414*c* indicating that the mobile or other requesting device with which the verification identifier 414*a* and Unified ID 414*b* are associated has opted out of having its activities monitored by host computing device 400. Database 410 may also hold data 412*d* that is associated with the requesting device associated with verification identifier 412*a* and Unified ID 412*b* which are associated with a device that does not have an opted out status. The data may be payload data received from the requesting device or additional data associated with the requesting device. In contrast, because the requesting device associated with verification identifier 414*a* and Unified ID 414*b* has a set opt-out flag or other indicator 414*c* indicating an opt-out status for the associated device, data is not stored in database 410 for that requesting device. Host computing device 400 also includes and executes verification module 420 for processing requests for Unified IDs and opt-out status received from mobile and other devices as described herein. Host computing device 400 may be a server, desktop computing device, tablet computing device, laptop or some type of other electronic device equipped with a processor that is able to execute verification module 420 as described herein. Verification module 420 may include various circuits, circuitry and one or more software components, programs, applications, or other units of code base or instructions configured to be executed by one or more processors such as processor 402 included in host computing device 400. Although verification module 420 is shown as a single distinct module in FIG. 4, it should be understood that the verification module may be implemented as multiple modules in place of the single module illustrated.

Figure 5:
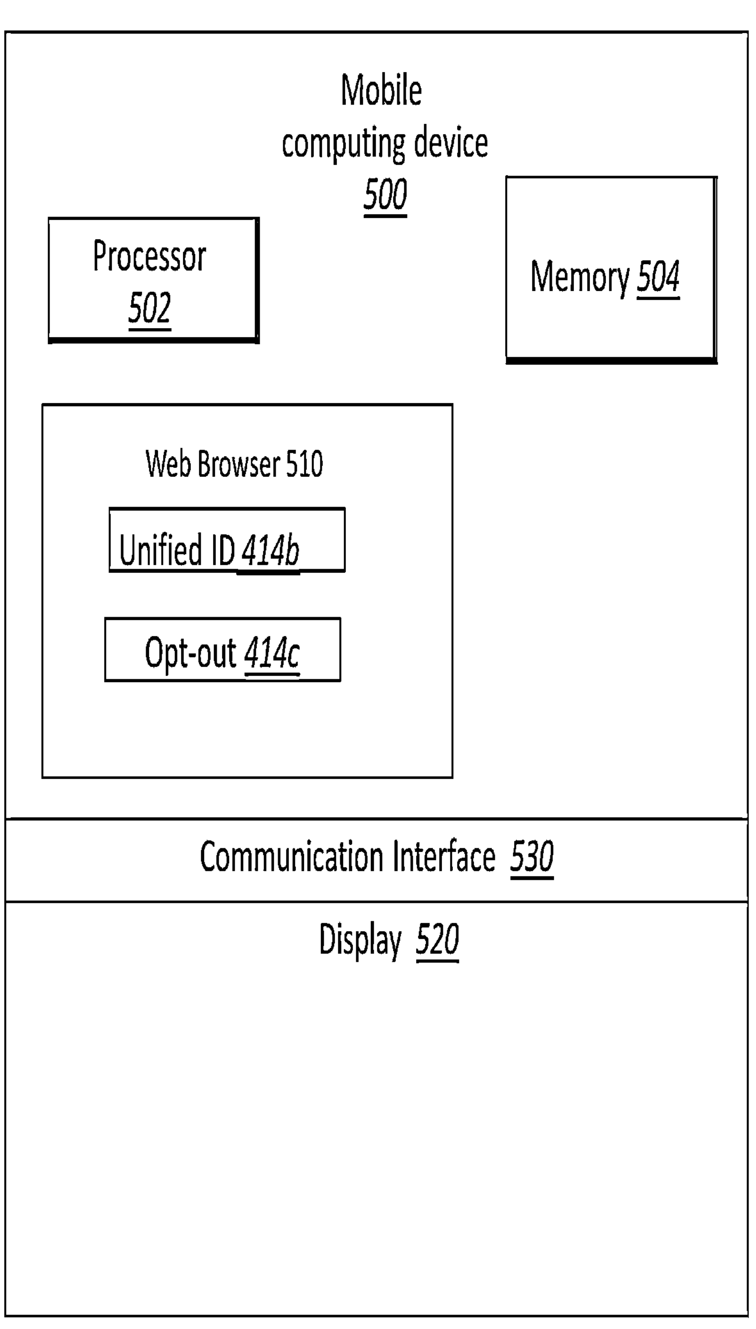
FIG. 5 depicts an exemplary mobile device suitable for use by an embodiment of the present invention.

FIG. 5 depicts an exemplary mobile device suitable for use by an embodiment of the present invention. Mobile computing device 500 may include one or more processors 502 and memory 504. Memory 504 may include Read Only Memory (ROM) and Random Access Memory (RAM). Mobile computing device 500 also includes communication interface 530 suitable for communicating over a network such as a voice or data network. Mobile computing device 500 may include web browser 510. Web browser 510 may store Unified ID 414*b* and an opt-out status indicator 414*c*. Mobile computing device 500 may also include display 520. Display 520 may be integrated into mobile computing device 500 or in communication with mobile computing device. Mobile computing device 500 may be a cell phone, smartphone, laptop, tablet or other mobile electronic device equipped with a processor and able to communicate with host computing device 400.

Figure 6:
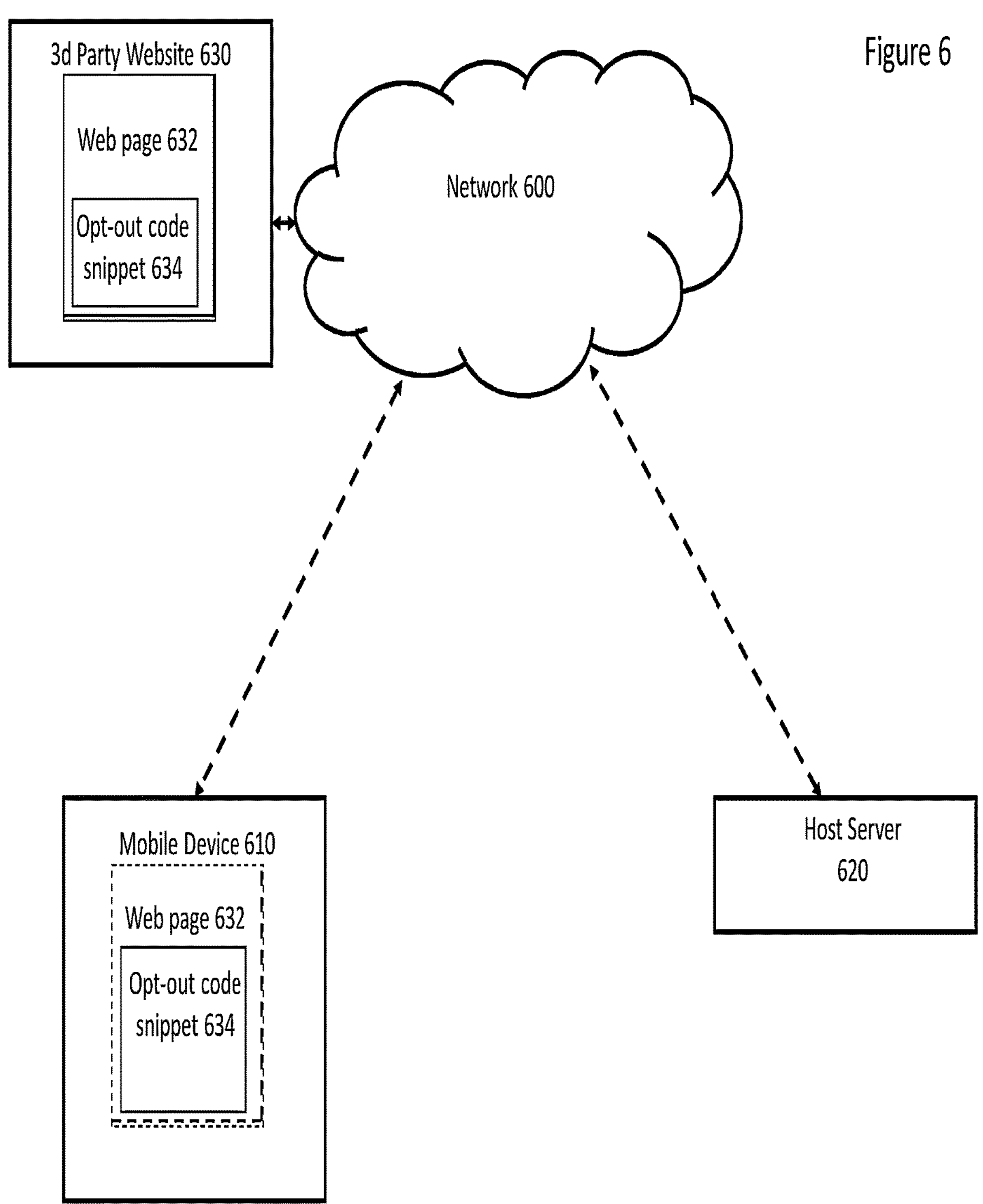
FIG. 6 depicts an exemplary environment suitable for practicing an embodiment of the present invention.

FIG. 6 depicts an exemplary environment suitable for practicing an embodiment of the present invention. A requesting device such as mobile device 610 may download web page 632 from 3$^{rd}$ party website 630 over network 600. A browser on mobile device 610 may execute opt-out code snippet 634 after loading web page 632. The execution of opt-out code snippet 634 triggers a request to host server 620 for a Unified ID and subsequent actions to record an opt-out status as described above. Network 600 may be any type of network including, without limitation, the Internet, a cellular network, a local area network (LAN) and an intranet. As mentioned previously, in another embodiment, a non-mobile computing device (not shown) may take the place of mobile device 610 and request a Unified ID and opt-out status.

As noted above, current conventional methods that rely on client-side storage of opt-out indicators are subject to failure due to the deletion of the opt-out indicators. Additionally, current server side methods of determining which mobile devices do not want their activity tracked that do not rely on client-side storage are probabilistic rather than deterministic which results in a degree of uncertainty in identifying the correct mobile devices even in the most accurate probabilistic systems. To lessen the amount of uncertainty, embodiments of the present invention may use a Unified ID with improved persistence that provides near-deterministic results in certain cases in determining opt-out status. In the event, a client-side indicator of the opt-out status has been removed, the verification of the Unified ID by the host server in embodiments may still determine the opt-out status recorded in the database that is associated with the Unified ID for the requesting device. Thus even if a client-side opt-out indicator is removed, the device still may not have its activities monitored because of the server-side opt-out indicator that is associated with the Unified ID. The use of this Unified ID relies on a verification identifier as described herein. For ease of explanation, some of the above description has focused on the use of a single verification identifier used to validate the Unified ID. However, it should be appreciated that almost every mobile and non-mobile device has multiple non-duplicative deterministic identifiers such as, but not limited to, a carrier ID, a device ID, a SIM card address, a cookie, an Ethernet card address, an advertising identifier such as (IDFA™ or GoogleID®), etc. that may be used as verification identifiers. Each of these identifiers has varying degrees of persistence meaning that they are all unique to that device but they may disappear unexpectedly or be replaced. Accordingly, embodiments of the present invention may use multiple deterministic identifiers as verification identifiers for a single device.

It should be appreciated that the verification module on the host server retrieves and identifies the different types of verification identifiers using different techniques depending upon which type of verification identifier is being retrieved from the device requesting the Unified ID. Some retrieval techniques will depend upon device characteristics. For example, some techniques may work with Android®-based devices but not with Apple®-based devices and vice-versa because of limitations as to what information each device makes available. Carrier ID retrieval by the host server has been discussed above. In one embodiment, to retrieve hardware-related verification identifiers such as device IDs, MAC addresses, advertising identifiers, Bluetooth™ addresses, etc., the host server may make use of an API in a Software Development Kit (SDK) to retrieve the verification identifier using functions the requesting device platform has made available. Other verification identifiers may be retrieved using other identifier-appropriate techniques. In an embodiment, the carrier ID may be used to bind the retrieved verification identifier to the Unified ID. In another embodiment, the verification identifier can also include anonymized or hashed data such as a phone number, email address, physical address or other static non-digital means of identification. In such a case, the data stored by the host server is non-PII in nature.

In one embodiment, given the varying degrees of persistence, the host server seeks to link all available verification identifiers together into a chain under a master identifier—the Unified ID. The goal of having a Unified ID is to achieve improved persistence and using a single ID would inevitably provide the possibility of a break in that persistence from time to time. In a preferred embodiment, multiple verification identifiers are linked to the Unified ID so that in the event one verification identifier is unavailable a second verification identifier may be used to verify the Unified ID instead. Further, by creating a chain of different verification identifiers for a particular device, the Unified ID will be able to reconnect the new verification identifier with that of the old one, thus maintaining correct opt-out status for a device. The host server seeks to create a daisy chain of unique verification identifiers. The goal is to find specific device identifiers that are truly unique and link those identifiers to one another—hence creating redundancy if one or more of the identifiers is erased, deleted, replaced (with a new unique identifier) or is otherwise inaccessible. By using transitivity to maintain the persistence and strength of the data set, any identifiers that are replaced may be linked back to their prior version (and hence opt-out status will be not be lost for that user). In one example the mobile device may purge one or more of these verification identifiers from time to time. For instance, the SIM card address is unique to a device and the user may need to replace the SIM card because it breaks. When multiple verification identifiers are linked to the Unified ID, another verification identifier can be used to verify the Unified ID and then the new SIM card address can be linked to/replace the old SIM card address thus allowing opt-out status for the Unified ID to be kept. Similarly, after the operating system updates, the mobile device may have purged one of the device verification identifiers, but potentially another one may still exist. By using a transitive relationship with a persistent identifier, the opt-out status for the Unified ID associated with the prior purged verification ID will be connected to the newly created verification identifier (created in the update). In essence, the opt-out status associated with the Unified ID will remain persistent before and after the update (as an example using the persistent carrier ID to connect the old identifier with the newly formed verification identifier). This methodology reinforces the reliability that not only is a particular device's Unified ID authenticated and guaranteed but that there will not be duplicate entries (or lost opt-out status) for the same device due to lack of persistence in any one particular identifier.

Although the description contained herein describes a mobile device as the device requesting a Unified ID and opt-out status, it should be appreciated that in alternate embodiments non-mobile computing devices may submit the requests.

It should be appreciated that although the Unified ID is described herein as a singular value tracked by the host server, other implementations are possible within the scope of the present invention. For example when multiple Unified IDs are found to be assigned to the same device, such as occurs in the circumstances discussed further below, rather than consolidating the identifiers by overwriting identifiers to a single Unified ID, the multiple IDs may be linked in the database so that the host server is aware that the different Unified IDs refer to the same device through the transitive property. Thus a Unified ID may be a single ID or may be a linked series of Unified IDs.

Figure 7:
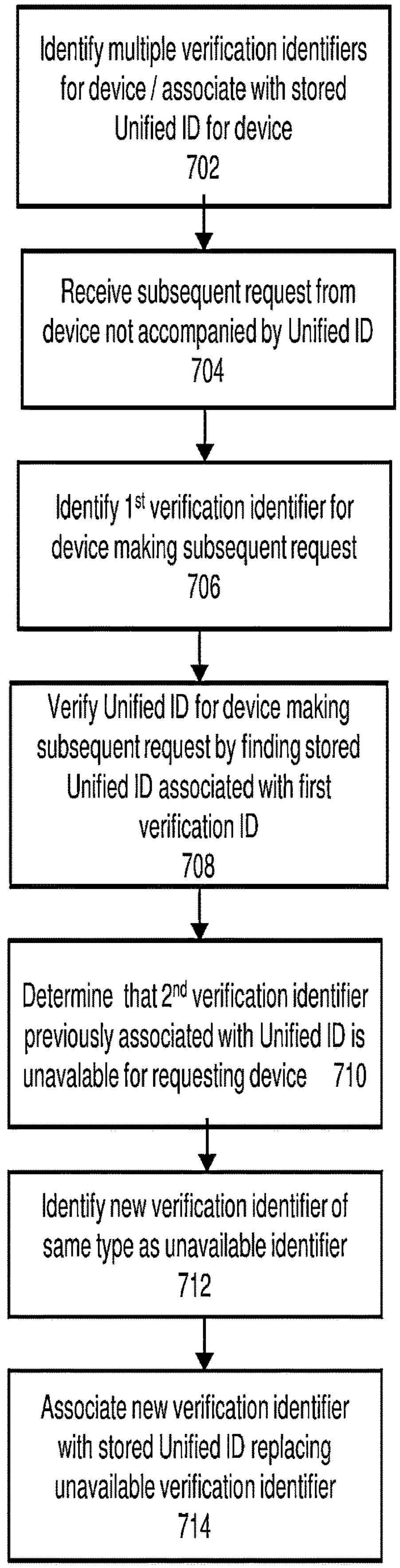
FIG. 7 depicts an exemplary sequence of steps performed by a host server to associate multiple verification identifiers with the same Unified ID and replace an unavailable verification identifier in an embodiment of the present invention.

FIG. 7 depicts an exemplary sequence of steps performed by a host server to associate multiple verification identifiers for a device with the same Unified ID and replace an unavailable verification identifier. The sequence begins with a verification module on the host server identifying multiple types of verification identifiers for a device and associating them with a stored Unified ID (step 702). The device may be a mobile device or non-mobile device. The identifying of the different types of verification identifiers may take place all at once or over time. The identification of the verification identifiers may result from analysis of requests received by the host servers from the requesting device or by queries from the host server to the device or third parties regarding the device. As noted previously, the verification identifiers may be different types of verification identifiers such as, but not limited to, a carrier ID, device ID, SIM card address, cookie, Ethernet card address, or advertising identifiers. The sequence continues with the host server receiving a subsequent request from the device that is not accompanied by a Unified ID (step 704). A first verification identifier (previously associated with the stored Unified ID) is identified for the requesting device (step 706) and used to verify the Unified ID for the device (i.e. by matching the verification ID to the stored Unified ID) (step 708). The host server may then determine that a second verification identifier previously associated with the Unified ID is unavailable (step 710) but that a new verification identifier of the same type is available (step 712). For example, a SIM card may be replaced in a requesting mobile device leading to this situation. The new verification identifier is associated with the stored Unified ID by the host server in place of the unavailable verification identifier (step 714).

Figure 8:
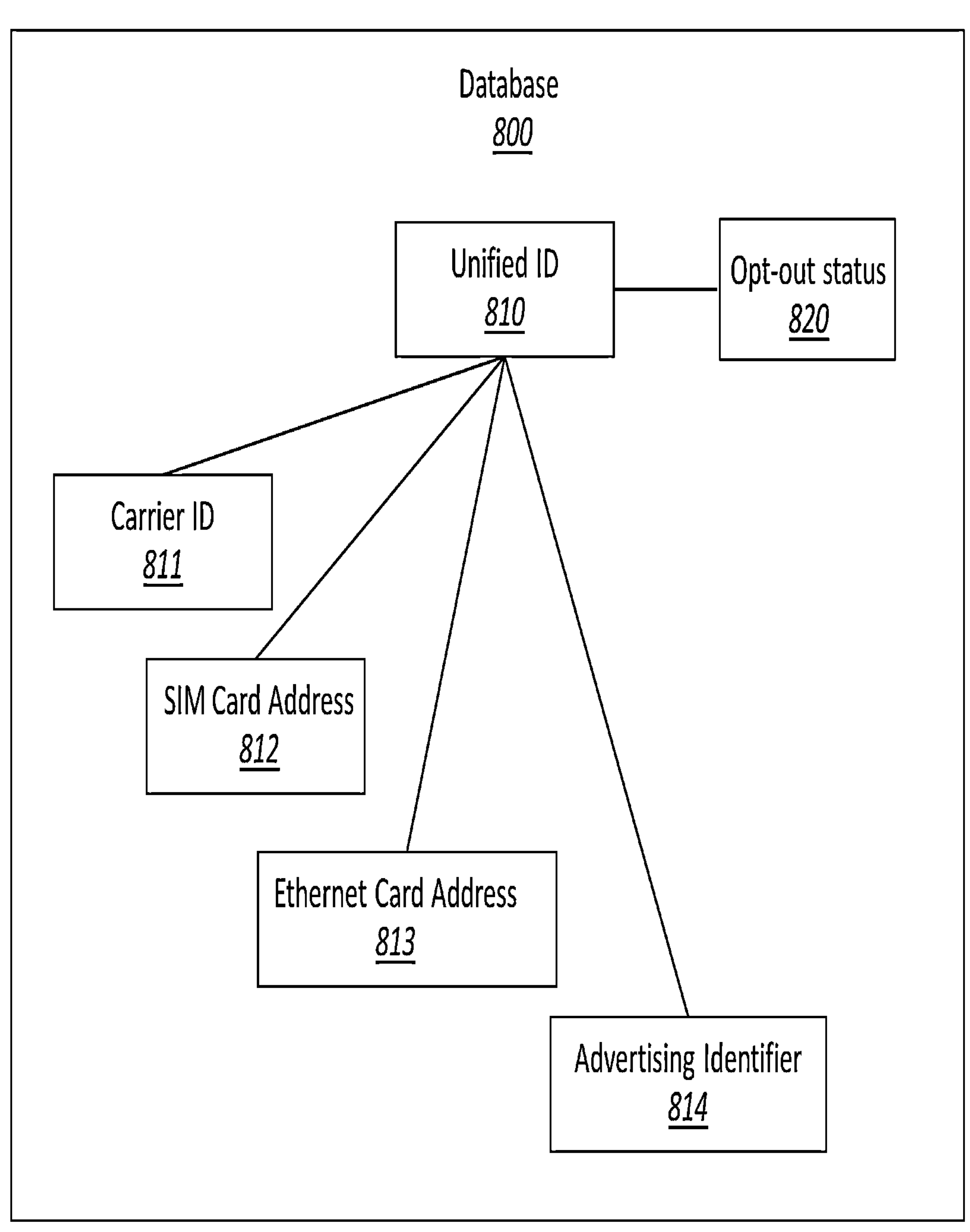
FIG. 8 depicts an exemplary chained relationship of identifiers stored in a database holding a Unified ID in an embodiment of the present invention.

FIG. 8 depicts an exemplary chained relationship of identifiers stored in the database holding a Unified ID in an embodiment of the present invention. Database 800 stores a Unified ID 810 previously assigned to a mobile or other requesting device. In this example, Unified ID 810 is associated with four different unique verification identifiers for the mobile device. More particularly, Unified ID 810 is associated with Carrier ID 811, SIM Card Address 812, Ethernet Card Address 813 and advertising identifier 814. With multiple verification identifiers 811, 812, 813 and 814 associated with Unified ID 810, identification of the mobile device can continue even when losing one or more of the verification identifiers. In one embodiment (not shown), the verification identifiers may also be linked with each other in database 800 in addition to being linked to Unified ID 810. It will be appreciated that database 800 will ordinarily hold hundreds or thousands of Unified IDs and their associated verification identifiers and that only a single Unified ID is illustrated herein for ease of description. Embodiments thus provide an improved mechanism for identifying a user's device that is not reliant on client-side storage and is less susceptible to single points of failure should a particular verification identifier become unavailable. Opt-out status 820 may be associated with Unified ID 810 in database 800. Opt-out status 820 indicates that data associated with the device corresponding to the Unified ID should not be collected and stored.

Although the linking of verification identifiers to a Unified ID has been discussed herein in the context of linking one or more verification identifiers to an existing or contemporaneously created Unified ID, it should be appreciated that other actions may be taken by the host server and/or verification module to save data prior to the creation of the Unified ID and later link that data to a Unified ID that are within the scope of the present invention. For example, in an alternate embodiment, the verification identifier for a mobile or other device may be determined that is not requesting a Unified ID and did not previously receive one from the host server. Data associated with the device such as but not limited to a carrier, a Wi-Fi provider, a device manufacturer, a model number, an IP address, a browser history, and a location, may be stored and associated with the verification identifier in database 800 or in another storage location. Subsequently when a request for a Unified ID from a device with the same verification identifier is received by the host server, the previously saved data for the verification identifier can be mapped to the newly created Unified ID. It should be appreciated that data associated with different verification identifiers for the same device may be saved as a result of a number of different interactions between the host server and the device over time in advance of the creation of the Unified ID and that all of the saved information may be consolidated to the Unified ID upon the Unified ID's creation.

Embodiments may extend the linking concept discussed above to account for the presence of multiple browsers on a single requesting device where different browsers have a different Unified ID. For example, a single requesting device may include a stand-alone web browser such as Safari™ while also including multiple in-app or WebKit-based browsers provided by different apps on a user's device. As a non-limiting example, a user's device may include apps for Facebook™, Twitter™ and LinkedIn™ in addition to a stand-alone browser. Each of these browsers may separately interact with the host server resulting in the initial creation of four separate Unified IDs with a different ETag or other form of the Unified ID returned to each browser. It should be noted that this situation may also occur where, as a result of cost or resource constraints, verification identifiers cannot be verified in advance of the creation of a Unified ID resulting in the creation of multiple Unified IDs for a single device. In one embodiment, the separate Unified IDs and their associated data may be consolidated together after creation through a number of techniques. For example, the verification module or other code executing on the host server may continually or periodically examine the database and identify Unified IDs that share other verification identifiers to identify Unified IDs associated with the same device. Alternatively, probabilistic data may enable the verification module to determine that the Unified IDs that are created for each of the browsers belong to the same device and should be consolidated under the same Unified ID. In one example the verification module may examine and compare browser information accessible in each of the different browsers and determine that the Unified ID created for that browser belong to the same device based on similarities. Other examples of probabilistic identification include using Wi-Fi network data patterns or device fingerprinting to aid in the increased likelihood of accurately identifying a device. It should be appreciated that preferably, whenever deterministic identifiers such as a carrier ID or device ID are available, the Unified ID associated with the deterministic identifiers will be used or created instead of relying on the probabilistic data.

In one embodiment, for devices that do not have an opt-out status, data may be collected and associated with the Unified ID. The data includes data received from the mobile or other requesting device (following verification of identity as discussed herein) and may indicate historical device activity. In one embodiment, this stored data may enable a specific sequence of data to be presented to the device from one or more sources over a period of time. For example, the first time the device loads a web page triggering verification by the host server, the device may be presented with a first set of data. A record of that first set of data being delivered may then be stored in stored data as payload data to be associated with Unified ID 810. At a subsequent point of time where the device processes the same or a different web page triggering verification by the host server, the verification module on the host server may identify the device, check the stored data, note the previous presentment of the first set of data and therefore identify a second set of data to be presented to the device. It will be appreciated that this sequence can continue indefinitely for additional sets of data beyond the two described above. In this manner, an entire sequence of data can be presented over time and over multiple platforms to the device.

Certain web browsers running on a user's device may present a separate technical challenge in that they may operate differently depending on whether the domain of the host server is trusted by user's device. Typically trust is established with a device based on a user action accessing a particular URL indicating that the user intentionally went to the domain. In one embodiment, when the domain is not trusted, the browser may block the request for the Unified ID resulting in the establishment of a different Unified ID each time the user accesses the domain. However, once the domain of the host server becomes trusted the browser no longer blocks the request for the Unified ID at which point the host server can establish the chain of identifiers. Any data previously gathered under the separate domain identifiers may then be consolidated after the fact under the assigned Unified ID using techniques described herein or discarded if the Unified ID has an opt-out status.

In another embodiment, certain web browsers running on a user's device may not share cache across domains compared to other browsers that will share a Unified ID across domains as long as the Unified ID is coming from the host server. For browsers that are not designed to share cache across domains (hereafter "alternate browsers"), embodiments of the present invention may provide an alternate process for providing a Unified ID to the requesting browser. In one embodiment, the alternate browser executing the JavaScript code to request the Unified ID is directed to a designated common intermediary for handling regardless of domain. In one example, the alternate browser may be identified through an "if-then request" followed by the designated intermediary requesting the Unified ID on the alternate browser's behalf. The Unified ID may be returned as part of a JSON response to be stored in the requesting alternate browser's cache. This alternate approach contrasts, for example, with other browsers where JavaScript code being executed by the browser may directly request the Unified ID for each domain and receive the same one in Response (in one embodiment received as the same ETag for each domain), In one embodiment, a request to a host server for a Unified ID may include an advertising identifier. If the request also includes a carrier ID, an advertising identifier→carrier relation may be created in the database (or an existing advertising identifier entry in the database may be refreshed with a new header). The Unified ID may then be linked to the advertising identifier when a mobile web request originates from over the carrier network using for example a 3G/4G/LTE (radio) signal as opposed to using Wi-Fi.

In one embodiment, for a carrier network established Unified ID to remain 100% persistent, the following may occur in a pre-determined time window (such as 7 days):

1) an advertising identifier is received over the carrier network, and
2) an ETag is placed over the carrier network in response to a request received from a device using the carrier network signal; or
3) an ETag is generated and the browser cache is not cleared until 1 and 2 occur.

In one embodiment, only device identifiers that are guaranteed, persistent and unique to a single particular device are used. Philosophically, in the embodiment, an approach may be taken to either have a Unified ID that is verified and reliable or else to not use a Unified ID at all. Therefore, when a Unified ID is found to be in existence, it is considered verified and trusted. To build a large database of device information, the registration of each Unified ID requires the host server to see each user's device at least once and register each identifier in its database, with the total number of devices in the identified database being dependent on the host server having delivered the Unified ID code snippet to a single device. In this manner a large dataset of Unified IDs can be built to be used by 3rd parties, such as trusted partners to the host server, as a way to create data differentiation beyond editorial content. Ultimately, this enables the creation of a data collective with an extensive data set.

In one embodiment, the Unified ID may be used to provide sequential advertising. For example, the Unified ID maintained by the host server may be utilized to create a brand story that unfolds by delivering different advertisements in a specified sequential order potentially across multiple sites or multiple apps and potentially using multiple ad formats. Without the Unified ID described herein, it would be difficult to serve ads to particular devices in a specified order of A, B, C, D as it would be difficult to differentiate between different devices and ad requests from the same device.

Although much of the description contained herein has described embodiments using a single host server to create or match a Unified ID to a requesting device, it should be appreciated that the use of multiple host servers under the control of a single entity may also be employed within the scope of the present invention and that the multiple servers may be geographically separated. Further, as explained below, in some embodiments, multiple entities in possession of partial information regarding a requesting device may cooperate to match a Unified ID to a requesting device.

Although the description herein of some of the embodiments describes a mobile device as the device requesting a Unified ID, it should be appreciated that in alternate embodiments non-mobile computing devices may submit the request and that the host server and second and additional entities as discussed herein may also handle such requests from non-mobile devices.

It should be appreciated that embodiments of the present invention as described herein address a technical problem inherent in the use of mobile and other devices in today's interconnected world. Mobile devices, by their very nature, connect to the Internet from different locations and using different communication protocols. The mobility of mobile devices makes reliance on probabilistic techniques for device identification such as tracking an IP address from which a request originates a sub-optimal approach to device identification and maintenance of opt-out status. Further, for both mobile and non-mobile devices, reliance on strictly client-side conventional techniques such as cookies or other techniques is problematic for network-based content providers as a means to identify a particular device since the maintenance of the client-side identifier is outside of their control. As described herein, embodiments provide a technique for mobile and other device identification that is more deterministic, more resilient and not subject to the inherent uncertainty associated with strictly probabilistic or strictly client-side techniques. Further, because of the increased resilience of the device identification, a device's opt-out status may be tracked with greater reliability.

Although the system described herein for improved device identification provides, in many circumstances, a deterministic approach for mobile and other device identification, in other circumstances the requesting device may not be able to determine the identity of the requesting device with 100% certainty. For example, when mobile carrier data is not available, and the Unified ID on the device cannot be verified as valid (such as is the case of devices with temporary identifiers), the verification module may resort to an alternative approach such as a probabilistic or statistical approach. In such situations a hybrid approach to associate data with an existing Unified ID may be employed by an embodiment of the present invention to supplement the deterministic techniques described above with a conventional probabilistic approach, such as identifying an IP address of the requesting device, or by comparing browser information on the user's device, or with a statistical approach. Although such an identification is not completely deterministic, it is partially deterministic as some of the data in the combined pool of data is definitively associated with a Unified ID for the device (through the use of a verification identifier). Thus even such a hybrid scenario represents an improvement of accuracy in device identification and the gathering of associated data based on the identification when compared to conventional probabilistic or statistical techniques for identifying devices.

In one embodiment, the host server may have access to contextual data about the browsing habits of users that view advertisements provided by the host server. For example, based on the stored data it may be possible to know that someone using the mobile device visits CNN every morning, at the same time, in the same location. Additionally, in another embodiment, technical patterns may be examined by the verification module, such as technical information that the device shares, to further "fingerprint" a device. In other embodiments, data gleaned from the device communication with the JavaScript code and requested data can be used to create a probabilistic graph of devices. In this manner, a set of data that is not absolutely certain to be associated with a user's device may nevertheless be combined with data already associated with the Unified ID through the use of a verification identifier as described above.

Similarly, in another embodiment, to identify a device, a statistical approach may be employed. For example, the verification module may start with a group of devices, then cluster those devices into subgroups of devices that likely match. Factors such as IP address, device type, browser version release, number of apps, contextual behavior and other device information may be continuously used by the verification module to narrow down a large array of potential device identities down to a smaller group, until the verification module has some pre-specified degree of certainty that one device is more probably associated with the Unified ID than the others.

In one embodiment, after the Unified ID has been flagged with an opt-out status in the database, the host server may receive a subsequent request for a resource from a mobile or other device that is not accompanied by the Unified ID. The host server may verify the Unified ID by identifying one of multiple verification identifiers for the requesting device and matching it to a verification identifier stored in the database that is associated with the Unified ID. Following the verifying of the Unified ID, the host server may note an opt-out status for the Unified ID and so processes the request without storing data that references the Unified ID.

In another embodiment, after the Unified ID has been flagged with an opt-out status in the database, the host server may receive a subsequent request for a resource from a mobile or other device that is not accompanied by the Unified ID. The host server may identify the Unified ID using a probabilistic or statistical technique. Following the identifying of the Unified ID, the host server may note an opt-out status for the probabilistically or statistically identified Unified ID and so processes the request without storing data that references the Unified ID.

In an embodiment, instead of returning the actual Unified ID to the mobile device, the host server may return an altered representation of the Unified ID such as a hash or other altered value and associate the returned altered value with the actual Unified ID in database 410.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computing-device implemented method for associating opt-out status to a unified identifier ("Unified ID") for a computing device, comprising:

associating, in a storage location, a plurality of unique verification identifiers with a Unified ID for the computing device;

receiving a request from the computing device at a host server for an opt-out status for tracking of the computing device;

identifying with the host server a first unique verification identifier for the computing device;

verifying the Unified ID by matching the first unique verification identifier for the computing device to one of the plurality of unique verification identifiers in the storage location;

assigning the opt-out status for the computing device to the Unified ID, the opt-out status stored in the storage location and associated with the Unified ID and the plurality of unique verification identifiers;

receiving a subsequent request at the host server from the computing device; and processing the subsequent request based on the assigned opt-out status, the host server not storing a record of device activity related to the request.

2. The method of claim 1, wherein the computing device is a mobile device.

3. The method of claim 1, wherein the computing device is a non-mobile device.

4. The method of claim 1, wherein one or more of the plurality of unique verification identifiers includes anonymized or hashed personally identifiable information.

5. The method of claim 4, wherein the anonymized or hashed personally identifiable information is an email address, physical address and/or phone number.

6. The method of claim 1, further comprising:

receiving an additional request for a resource from the computing device;

determining that one of the plurality of unique verification identifiers is no longer valid for the computing device but that a new replacement verification identifier exists; and replacing the determined one of the plurality of unique verification identifiers that is no longer valid in the storage location with the new replacement verification identifier.

7. The method of claim 6, wherein the new replacement verification identifier is a new SIM card address for the computing device.

8. A non-transitory medium holding executable instructions for associating opt-out status to a unified identifier ("Unified ID") for a computing device, the instructions when executed by one or more processors on one or more computing devices causing the one or more computing devices to:

associate, in a storage location, a plurality of unique verification identifiers with a Unified ID for the computing device;

receive a request from the computing device at a host server for an opt-out status for tracking of the computing device;

identify with the host server a first unique verification identifier for the computing device;

verify the Unified ID by matching the first unique verification identifier for the computing device to one of the plurality of unique verification identifiers in the storage location;

assign the opt-out status for the computing device to the Unified ID, the opt-out status stored in the storage location and associated with the Unified ID and the plurality of unique verification identifiers;

receive a subsequent request at the host server from the computing device; and process the subsequent request based on the assigned opt-out status, the host server not storing a record of device activity related to the request.

9. The medium of claim 8, wherein the computing device is a mobile device.

10. The medium of claim 8, wherein the computing device is a non-mobile device.

11. The medium of claim 8, wherein one or more of the plurality of unique verification identifiers includes anonymized or hashed personally identifiable information.

12. The medium of claim 11, wherein the anonymized or hashed personally identifiable information is an email address, physical address and/or phone number.

13. The medium of claim 8, wherein the instructions when executed further cause the one or more computing devices to:

receive an additional request for a resource from the computing device;

determine that one of the plurality of unique verification identifiers is no longer valid for the computing device but that a new replacement verification identifier exists; and replace the determined one of the plurality of unique verification identifiers that is no longer valid in the storage location with the new replacement verification identifier.

14. The medium of claim 13, wherein the new replacement verification identifier is a new SIM card address for the computing device.

* * * * *